United States Patent [19]

Kanome et al.

[11] Patent Number: 5,137,661
[45] Date of Patent: Aug. 11, 1992

[54] PROCESS FOR PRODUCING OPTICAL RECORDING MEDIUM

[75] Inventors: Osamu Kanome, Kawasaki; Hiroyuki Sugata, Yamato; Tetsuya Satoh, Kawasaki; Yukitoshi Ohkubo; Tsuyoshi Santoh, both of Yokohama, all of Japan

[73] Assignee: Canon Kabushiki Kaisha, Tokyo, Japan

[21] Appl. No.: 759,627

[22] Filed: Sep. 16, 1991

Related U.S. Application Data

[63] Continuation of Ser. No. 659,454, Feb. 2, 1991, abandoned, which is a continuation of Ser. No. 435,179, Nov. 13, 1989, abandoned.

[30] Foreign Application Priority Data

Nov. 16, 1988 [JP] Japan ............................... 63-289828
Jun. 30, 1989 [JP] Japan ............................... 1-169418

[51] Int. Cl.$^5$ ............................................. B29D 17/00
[52] U.S. Cl. ................................. 264/1.3; 264/1.6; 264/1.7; 264/106; 264/145; 264/162; 425/385; 425/810
[58] Field of Search .................... 264/1.3, 1.6, 1.7, 2.7, 264/106, 107, 210.4, 162, 167; 425/810, 105, 385

[56] References Cited

U.S. PATENT DOCUMENTS

| | | | |
|---|---|---|---|
| 3,142,599 | 7/1964 | Chavannes | 156/210 |
| 3,893,795 | 7/1975 | Nauta | 425/808 |
| 3,994,561 | 11/1976 | Kotovitch | 350/103 |
| 3,999,928 | 12/1976 | Asakura | 425/388 |
| 4,556,378 | 12/1985 | Nyfeler et al. | 264/1.3 |
| 4,601,861 | 7/1986 | Pricone et al. | 425/385 |
| 4,790,893 | 12/1988 | Watkins | 264/1.3 |
| 4,836,874 | 6/1989 | Foster | 264/1.3 |
| 4,871,601 | 10/1989 | Miura et al. | 428/64 |
| 4,876,042 | 10/1989 | Imataki et al. | 264/39 |
| 4,892,606 | 1/1990 | Miyazaki et al. | 156/275.5 |
| 4,913,858 | 4/1990 | Miekka et al. | 264/1.3 |
| 4,921,780 | 5/1990 | Oguchi et al. | 430/495 |
| 4,923,390 | 5/1990 | Oguchi et al. | 430/270 |

FOREIGN PATENT DOCUMENTS

| | | |
|---|---|---|
| 0226123 | 6/1987 | European Pat. Off. . |
| 7400526 | 8/1974 | France . |
| 087203 | 7/1981 | Japan . |
| 56-157319 | 12/1981 | Japan ................... 264/1.6 |
| 62-071040 | 4/1987 | Japan . |
| 63-031847 | 2/1988 | Japan . |
| 308617 | 12/1989 | Japan . |

OTHER PUBLICATIONS

Feinwerktechnik & Messtechnik, vol. 95, No. 8 Dec. 1987, pp. 503–505, Munich, DE; K. Pietzsch: "Prufung von Compact Discs mit einem automatischen Laser-Scanner System".

*Primary Examiner*—Jay H. Woo
*Assistant Examiner*—Khanh P. Nguyen
*Attorney, Agent, or Firm*—Fitzpatrick, Cella, Harper & Scinto

[57] ABSTRACT

A process for producing an optical recording medium, including the steps of: melt-extruding a resin to form a resin sheet; passing the resin sheet under pressure between a first roller having a predetermined unevenness pattern and a second roller disposed opposite thereto before the resin sheet is hardened, thereby to transfer the unevenness pattern to a surface of the resin sheet; and forming a recording layer having an organic coloring matter on the surface of the resin sheet provided with the unevenness pattern; wherein the steps are conducted while the resin sheet is moved.

18 Claims, 4 Drawing Sheets

PROCESS FOR PRODUCING OPTICAL RECORDING MEDIUM

This application is a continuation of application Ser. No. 659,454 filed Feb. 21, 1991, now abandoned, which is a continuation of application Ser. No. 435,179 filed Nov. 13, 1989, now abandoned.

FIELD OF THE INVENTION AND RELATED ART

The present invention relates to a process for producing an optical recording medium wherein data (or information) is recorded and/or reproduced by use of light.

Generally speaking, in the substrate used for an optical recording medium such as optical disk and optical card, there is formed a predetermined pattern (hereinafter, referred to as "pre-format") such as start pit, stop pit, or groove for guiding a laser beam for recording and/or reproduction. Hitherto, in order to produce the optical recording medium substrate having such an unevenness pre-format, there has been used an injection molding process, so-called "2P" (photopolymerization) process using an ultraviolet-curing resin, a casting (or cast molding) process using a thermoplastic resin, etc. However, these conventional processes are not necessarily suitable for mass-production.

On the other hand, in the prior art, in order to dispose a recording layer on the above-mentioned substrate, a film as the recording layer is formed by using vacuum evaporation or sputtering, or the recording layer for a coating-type recording medium is formed by using a spinner. Further, in order to dispose a protective member on the recording layer, a protective member is bonded thereto, or a protective coating film is formed thereon These techniques have been selected corresponding to an intended recording medium.

However, in the prior art, the above-mentioned various techniques have been selected separately or independently corresponding to respective production steps, and therefore the conventional production process is not consistent in its respective steps. Accordingly, it is necessary to provide a stockage container or device in order to connect respective steps, and sometimes it is necessary to store an in-process product in such a stockage device for a long period of time. As a result, there occur various disadvantages such that the resultant productivity is low, and simultaneously, the reliability is lowered due to attachment of dust or due to contamination.

Particularly, in the most popular injection molding process for shaping the substrate, each substrate is separately formed one by one by injection and therefore it is necessary to treat the resultant substrate one by one in the subsequent steps. For example, in order to form the recording layer of an inorganic-type recording medium, each recording medium substrate is separately loaded on the sample mount of an apparatus for sputtering or vacuum evaporation, and after the formation of a prescribed recording film, each recording medium substrate is removed from the sample mount one by one and stored in a storage container. In the case of a coating-type organic recording medium, it is necessary to repetitively treat the substrate one by one by using the spinner. As a result, the conventional production steps become long and complicated.

Such a conventional production process is considerably disadvantageous in view of optical recording wherein the reliability is affected even by the attachment of fine dust. In order to solve the above-mentioned problem, the recording medium has been produced in a clean room having a very high cleanness, and the production process has been automated by using an automatic handling device such as robot without using manual operation. However, these methods undesirably raise the apparatus cost.

On the other hand, as a continuous production process for an optical recording medium Japanese Patent Publication (JP-B, KOKOKU) No. 31847/1988 discloses a process for continuously producing a flexible disk wherein a layer of an ultraviolet-curing resin is disposed on a base film and a pre-format is transferred thereto by using a stamper and then cured (or hardened). In this method, however, since the base film which has preliminarily been wound up into a roll is fed into a production apparatus, dust is liable to adhere to the surface of the base film at the time of the production or winding thereof, whereby the dust is included in the interior of the resultant disk. Further, in order to remove the dust from the base film surface, e.g., it is necessary to wash the surface with a solvent, etc., and therefore the production process must include a washing step using the solvent, and a drying step. As a result, there occurs a disadvantage such that the production steps become complicated and the production cost is raised.

Further, Japanese Laid-Open Patent Application (JP-A, KOKAI) No. 71040/1987 discloses a process for continuously producing an optical recording medium wherein a radiation-curing resin is applied onto a continuous base film of a synthetic polymer, the resultant coating is exposed to light or an electron beam and then developed, and thereafter an optical recording layer predominantly comprising an organic colorant is continuously formed. However, since such a method requires a developing step, the steps thereof become complicated. Further, when the recording layer comprising the organic colorant is formed after the development, the developer liquid can affect the formation of the recording layer.

More specifically, in a case where the developer liquid remains on the surface in which the recording layer is to be formed, e.g., between the grooves thereof, when a coating liquid is applied onto such a surface to form the recording layer, the concentration of the coating liquid may be changed at the portion on which the developer remains. As a result, the film thickness of the recording layer can be difficult to be controlled or the radiation-curing resin dissolved in the solvent can deteriorate the organic colorant constituting the recording layer.

SUMMARY OF THE INVENTION

A principal object of the present invention is, in view of the above-mentioned problems encountered in the prior art, to provide a process and an apparatus for producing an optical recording medium, which is excellent in productivity and is capable of providing an optical recording medium such as an optical disk and an optical card having good reliability at a low cost.

According to the present invention, there is provided a process for producing an optical recording medium, comprising the steps of:

melt-extruding a resin to form a resin sheet;
passing the resin sheet under pressure between a first roller having a predetermined unevenness pattern and a second roller disposed opposite thereto before the resin sheet is hardened, thereby to transfer the unevenness pattern to a surface of the resin sheet; and forming a recording layer comprising an organic coloring matter on the surface of the resin sheet provided with the unevenness pattern, wherein said steps are conducted while the resin sheet is moved.

The present invention also provides an apparatus for producing an optical recording medium, comprising:

means for melt-extruding a resin to form a resin sheet;

means for transferring a predetermined unevenness pattern to a surface of the resin sheet; and means for coating the surface of the resin sheet provided with the unevenness pattern with a recording layer comprising an organic coloring matter.

In the present invention, unlike the prior art, a pre-format and/or a mirror surface may directly be transferred to a resin sheet simultaneously with the formation of the resin sheet. As a result, a step of applying a radiation-curing resin or a step of developing an exposed layer may be omitted and further the formation of a recording layer comprising an organic coloring matter (or colorant) in the subsequent step may be conducted without ill effect of a developer liquid on the resultant recording layer. Thus, the present invention may provide an optical recording medium through a relatively small number of steps.

These and other objects, features and advantages of the present invention will become more apparent upon a consideration of the following description of the preferred embodiments of the present invention taken in conjunction with the accompanying drawings.

DETAILED DESCRIPTION OF THE INVENTION

Figure 1:
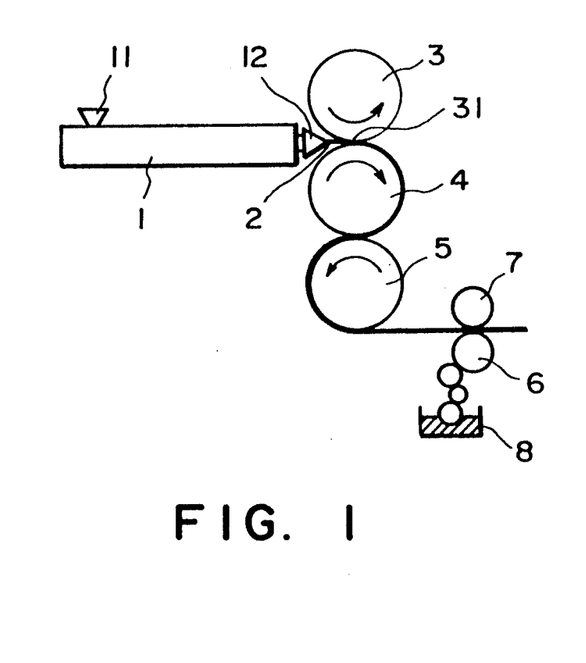
FIGS. 1 and 2 are schematic sectional views each showing an embodiment of the present invention.
Figure 2:
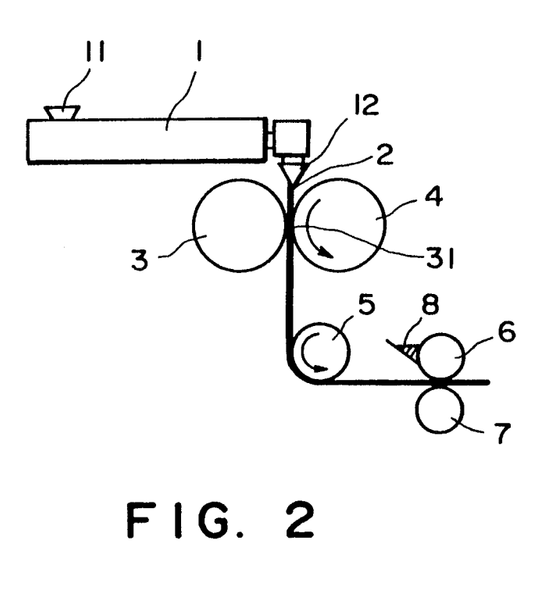

FIGS. 1 and 2 are schematic sectional views each showing an embodiment of the process for producing an optical recording medium according to the present invention.

Referring to FIG. 1, a resin as a material for a substrate is melted and extruded by means of a melt-extruder 1 to form a resin sheet 2 to be used for an optical recording medium substrate. The resin sheet 2 is then sandwiched between a roller-type stamper 4 having thereon a pattern (i.e., pre-format pattern) corresponding to a predetermined pre-format, and a roller 3 having a mirror surface under pressure at a nip point 31, whereby the pre-format is transferred to one of the surfaces of the resin sheet 2 and a mirror surface is transferred to the other surface of the resin sheet 2, and the thickness of the resin sheet 2 is uniformized. Thereafter, a material 8 for a recording layer is applied onto the surface of the resin sheet 2 on which the pre-format has been formed, by means of a gravure roller 6 and a pressing roller 7, thereby to form a recording layer on the resin sheet 2.

In the embodiment shown in FIG. 1, resin pellets (not shown) are charged into the extruder 1 through a hopper 11, and are melted or fused by heating in the barrel of the extruder 1. The melted resin is then pressurized by means of a screw (not shown) disposed in the extruder 1 and shaped into a sheet form by means of a T-die (or T-shaped die) 12. It is preferred that the T-die 12 may preferably be disposed so that the resin sheet 2 is extruded from the T-die 12 to a clearance between the roller-type stamper 4 and the mirror surface roller 3, in view of precise or correct transfer of the pre-format. After the resin sheet 2 is extruded from the T-die 12, it is sandwiched between the roller stamper 4 and the mirror surface roller 3, whereby a predetermined pattern formed on the roller stamper 4 is transferred to the resin sheet 2 to form thereon a pre-format. At this time, the resin sheet 2 may preferably be close to a melted state (or almost in a melted state). This is because the resin in such a state is sufficiently pressed into the unevenness of the stamper 4, whereby even a minute pattern of the stamper 4 is precisely transferred to the resin sheet 2.

Accordingly, it is preferred to heat the T-die 12 up to a temperature as high as possible, as long as the resin is not substantially scorched. More specifically, the temperature of the T-die 12 may preferably be higher than Tg (glass transition temperature) of the resin by 110°-200° C., more preferably 130°-190° C. For example, when a polycarbonate resin of which Tg is generally 145°-150° C. is used, the T-die 12 may preferably be heated up to 260°-340° C., more preferably 280°-330° C., particularly preferably 290°-320° C.

Further, when the resin sheet 2 is considerably cooled between the T-die 12 and the roller stamper 4, there occurs a tendency such that the pre-format is not sufficiently transferred and birefringence occurs in the resin sheet 2. Therefore, the distance from the T-die 12 to the nip point 31 between the roller 4 having the pre-format pattern and the first mirror surface roller 3 may preferably be 20 cm or shorter, more preferably 15 cm or shorter, particularly preferably 10 cm or shorter, as long as the T-die 12 does not contact the roller 3 or 4. The ambient temperature around the above-mentioned distance between the T-die 12 and the nip point 31 may preferably be 60° C. or higher.

The term "die" used in the present invention refers to a device having a through-hole with a predetermined shape. The die imparts a material such as resin by passing the material through it (i.e., by extrusion).

In the present invention, the die may preferably be one having a circular or substantially circular opening as an inlet for a material, and has an orifice or opening in the form of a slit as an outlet for the material. Specific examples of such a die may include: the above-mentioned T-die having a through-hole with a planar shape like "T"; a so-called "fish tail die" having a through-hole with a planar shape like a fish tail; a so-called "coat hanger die" having a through-hole with a planar shape like a coat hanger.

Figure 4:
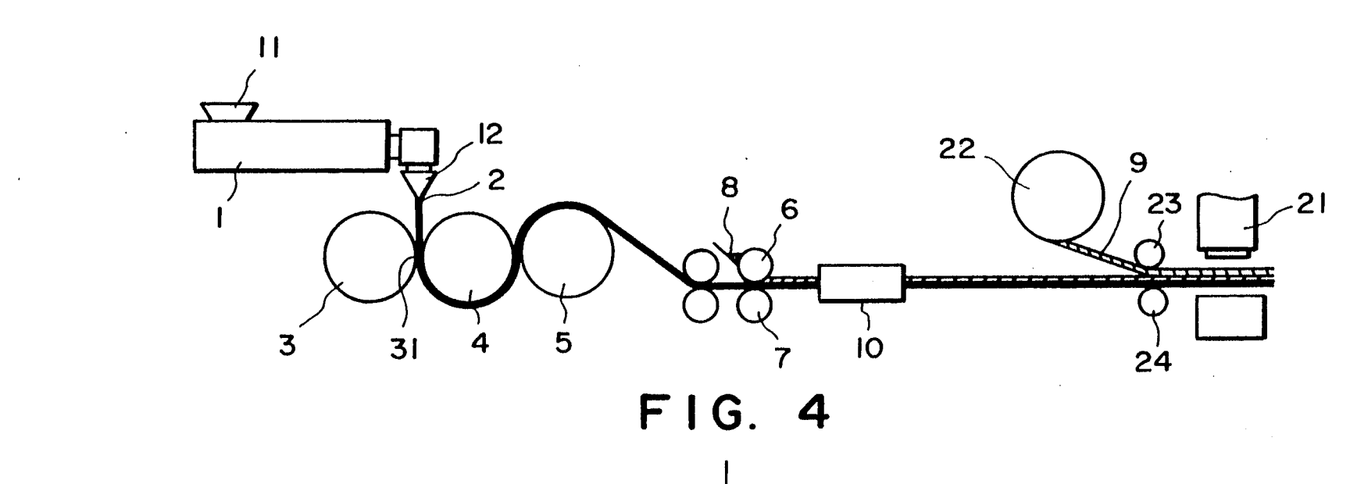

In the present invention, the resin sheet 2 may preferably be extruded vertically as shown in FIG. 2 or 4, i.e., the resin sheet 2 may preferably be extruded toward a nip point 31 so that the nip point 31 is disposed under the T-die 12 along the vertical direction, in view of precise extrusion of the resin sheet 2 to the nip point 31. Since the resin constituting the resin sheet 2 is almost in a melted state, it may more exactly be extruded toward the nip point 31 in the above-mentioned vertical extrusion, as compared with in the horizontal extrusion as shown in FIG. 1.

In the present invention, the pre-format may preferably be transferred from the stamper 4 to the resin sheet 2 with a transfer precision as described hereinafter of at least 60% or higher, generally 70% or higher, more preferably 80% or higher, particularly 90% or higher. Further, the temperature of the roller stamper 4, and those of the mirror surface rollers 3 and 5 may be ones generally used in the extrusion molding for a resin sheet (e.g., 100°–150° C.).

In the present invention, the thickness of the resin sheet 2 to be used as an optical recording medium substrate may be regulated in various ways by changing the clearances between the roller stamper 4 and the mirror surface rollers 3 and 5. However, the thickness of the resin sheet 2 may preferably be 0.2–2.0 mm, more preferably 0.4–1.5 mm, in order to form a resin sheet wherein distortion or strain is not substantially observed, or to transfer the unevenness pre-format pattern to the resin sheet 2 with good transfer precision. The rollers 3, 4 and 5 determining the resin sheet thickness may preferably be disposed in parallel with each other as exactly as possible, so as to prevent irregularity or unevenness in the sheet thickness capable of causing an error in recording or reproduction. When the angle formed by the respective roller axes is represented by "$\theta$", the rollers (particularly, the rollers 3 and 4) may preferably be disposed so that $\tan\theta$ is $5\times10^{-3}$ or smaller, more preferably $1\times10^{-3}$ or smaller.

Since the birefringence of the resin sheet becomes a serious obstacle when an energy beam for recording or reproduction is incident to the recording layer disposed on a substrate from the substrate side. Accordingly, the birefringence of the resin sheet corresponding to a single path as described hereinafter may generally be 50 nm or smaller, preferably 30 nm or smaller, more preferably 20 nm or smaller, particularly preferably 15 nm or smaller, at the wavelength of light to be used for recording and/or reproduction.

On the thus prepared resin sheet 2 having a pre-format, a recording layer wherein data or information can be recorded and/or reproduced by using light is formed by coating. When the recording layer is formed on the resin sheet by coating, the resin sheet (particularly, the surface thereof on which the recording layer is to be formed) may have a flatness as described hereinafter of at least 10 mm or below, preferably 5 mm or below, more preferably 3 mm or below, particularly preferably 1 mm or below. If the flatness exceeds 10 mm, the film thickness of the recording layer is liable to be uneven. Particularly, in a case where the recording layer comprises an organic coloring matter or colorant, the coating liquid is liable to collect in the concavity of the resin sheet. Further, since the reflectivity of an organic-type thin film is changed depending on the film thickness thereof, poor flatness cannot provide a constant reflectivity of the recording layer, thereby to cause deterioration in S/N ratio and an error in recording or reproduction. In the present invention, unevenness or irregularity in the reflectivity of the optical recording medium as described hereinafter may generally be at least 40% or below, preferably 30% or below, more preferably 20% or below, particularly preferably 10% or below.

In order to reduce the birefringence of the resin sheet and to enhance the flatness thereof, it is preferred that the extrusion rate of the resin sheet is precisely controlled, a tension is not substantially applied to the resin sheet, and the resin sheet is not substantially sagged or slackened. In order to apply substantially no tension to the resin sheet and not to sag it, it is preferred to regulate the rotational speeds of the roller stamper 4 and the third mirror surface roller 5.

More specifically, the speed ratio ($w_4/w_5$) between the rotational speed (peripheral speed) of the rollers 4 ($w_4$) and the rotational speed of the roller 5 ($w_5$) may preferably satisfy the relationship of $1.0 < w_4/w_5 \leq 1.004$, more preferably $1.001 \leq w_4/w_5 \leq 1.003$, particularly preferably $1.001 \leq w_4/w_5 \leq 1.0025$. If the speed ratio ($w_4/w_5$) is 1 or smaller, a tension is applied to the resin sheet to cause birefringence, and the transfer of a pre-format becomes insufficient. On the other hand, the ratio ($w_4/w_5$) is larger than 1.004, the birefringence is less liable to occur, but the flatness of the resin sheet is deteriorated. Further, the resin sheet is liable to slip on the pre-format roller 4 to decrease the transfer precision of the pre-format.

The conveying speed of the resin sheet 2 may preferably be such that the resin sheet is not substantially hardened or solidified before the shaping thereof and the transfer of the pre-format does not become uneven. On the other hand, in a step wherein a recording layer is continuously formed by coating on the resin sheet, the conveying speed of the resin sheet may preferably be such that the recording layer having a uniform thickness is constantly formed. More specifically, in order to precisely transfer the pre-format and to form a uniform recording layer, the conveying speed of the resin sheet 2 may preferably be 0.3 m/min to 10 m/min, more preferably 0.5 m/min to 5 m/min, particularly preferably 1 m/min to 4 m/min.

In the present invention, the recording layer may be formed by various coating methods such as gravure coating, curtain coating, spray coating, dip coating, bar coating and blade coating.

The recording layer to be formed in such a step may preferably have a thickness of 500 to 5000 Å. After the recording layer is formed by coating, it may generally be subjected to a drying step. In the process for producing an optical recording medium according to the present invention, however, in a case where a solution of the recording layer material is applied onto a resin sheet having a pre-format after the pre-format is fixed and before the resin sheet is cooled to normal or room temperature, the step of drying the recording layer may be omitted or simplified, whereby the steps constituting the production process may further be simplified as a whole. Incidentally, in such a case, it is preferred to form the recording layer by coating after the resin sheet, which has been extruded and caused to have a pre-format by shaping, shows a surface temperature of 50° C. or below, more preferably 40° C. or below. This is because a crack can occur on the substrate surface due to the solvent contained in the coating liquid for the recording layer, when the surface temperature of the substrate is too high.

The substrate may preferably be composed of a thermoplastic resin showing a high transmittance with respect to a light used for recording and/or reproduction. Examples thereof may include: acrylic resin, polyester resin, polycarbonate resin, vinyl resin, polysulfone resin, polyolefin resin, polyamide resin, cellulose derivative, etc.

For the purpose of data reproduction by using a light having a wavelength of, e.g., 650 nm or longer, particularly 700–900 nm, the organic colorant used in the recording layer should preferably show a large difference in reflectivity between recorded portions (pits) and non-recorded portions. Further, for the purpose of recording, the organic colorant should preferably show an absorption in the above-described wavelength range. The organic colorant may preferably be one such that the quantity of an energy required for causing a change therein in reflectivity based on the irradiation of an energy beam is as small as possible. Further, the organic colorant may preferably be one such that its reflectivity in the recorded portions (pits) or non-recorded portions is less liable to be changed under irradiation of an energy beam of a reproduction light.

Examples of such a colorant or coloring matter such as dye or pigment for the recording layer may include: anthraquinone derivatives (particularly those having an indanthrene skeleton), dioxadine compounds and their derivatives, triphenodithiazine compounds, phenanthrene derivatives, cyanine compounds, merocyanine compounds, pyrilium compounds, xanthene compounds, triphenylmethane compounds, croconium dyes, azo coloring matters, crocones, azines, indigoids, polymethine coloring matters, azulenes, squarium derivatives, sulfide dyes, and metal dithiolate complexes.

Such a colorant as described above can be used alone or mixed with a stabilizer for the colorant.

Examples of the stabilizer may include various metal chelate compounds, such as compounds having central atoms such as Zn, Cu, Ni, Cr, Co, Mn, Pd and Zr with polydentate (or multidentate) ligands inclusive of tetradentate ligands such as $N_4$, $N_2O_2$, $N_2S_2$, $S_4$, $O_2S_2$ and $O_4$ or combination of these; various aromatic amines or diamines, nitrogen-containing aromatic compounds and their onium salts, such as aminium salt, diimmonium salt, pyridinium salt and quinolynium salt. The stabilizer may also be a pyrilium salt which is a salt of an oxygen-containing aromatic compound. These stabilizers can be used in combination of plural species.

The stabilizer may be selected from examples thereof described hereinabove in consideration of the compatibility or solubility with the organic colorant and a solvent used in combination therewith. The stabilizer may be added in 1 to 50 wt. %, more preferably 10 to 30 wt. % of the organic colorant. Too little stabilizer fails to show its effect sufficiently, and the addition in excess of 50 wt. % can lead to a decrease in sensitivity.

The solvent used for dissolving the above-mentioned organic colorant, stabilizer, etc., may preferably be one which does not substantially affect the resin sheet. Examples of such a solvent may include; diacetone alcohol, cellosolve, 1-methoxy-2-propanol; or a mixture solvent comprising the above-mentioned solvent and a small amount of a halogen-containing solvent added thereto.

The optical recording medium in the form of a sheet produced in the above-mentioned manner is then cut or punched to be formed into individual optical disks optical cards, etc.

In the present invention, it is preferred to provide a step of disposing a protective member on the recording layer surface, and a step of cutting the optical recording medium sheet comprising the recording layer and the protective member into individual recording media, which are continuously or successively conducted after the formation of the recording layer. Such an embodiment is particularly advantageous since dust may substantially perfectly be prevented from invading into an optical recording medium, and an optical recording medium having a further high reliability may be provided.

Figure 3:
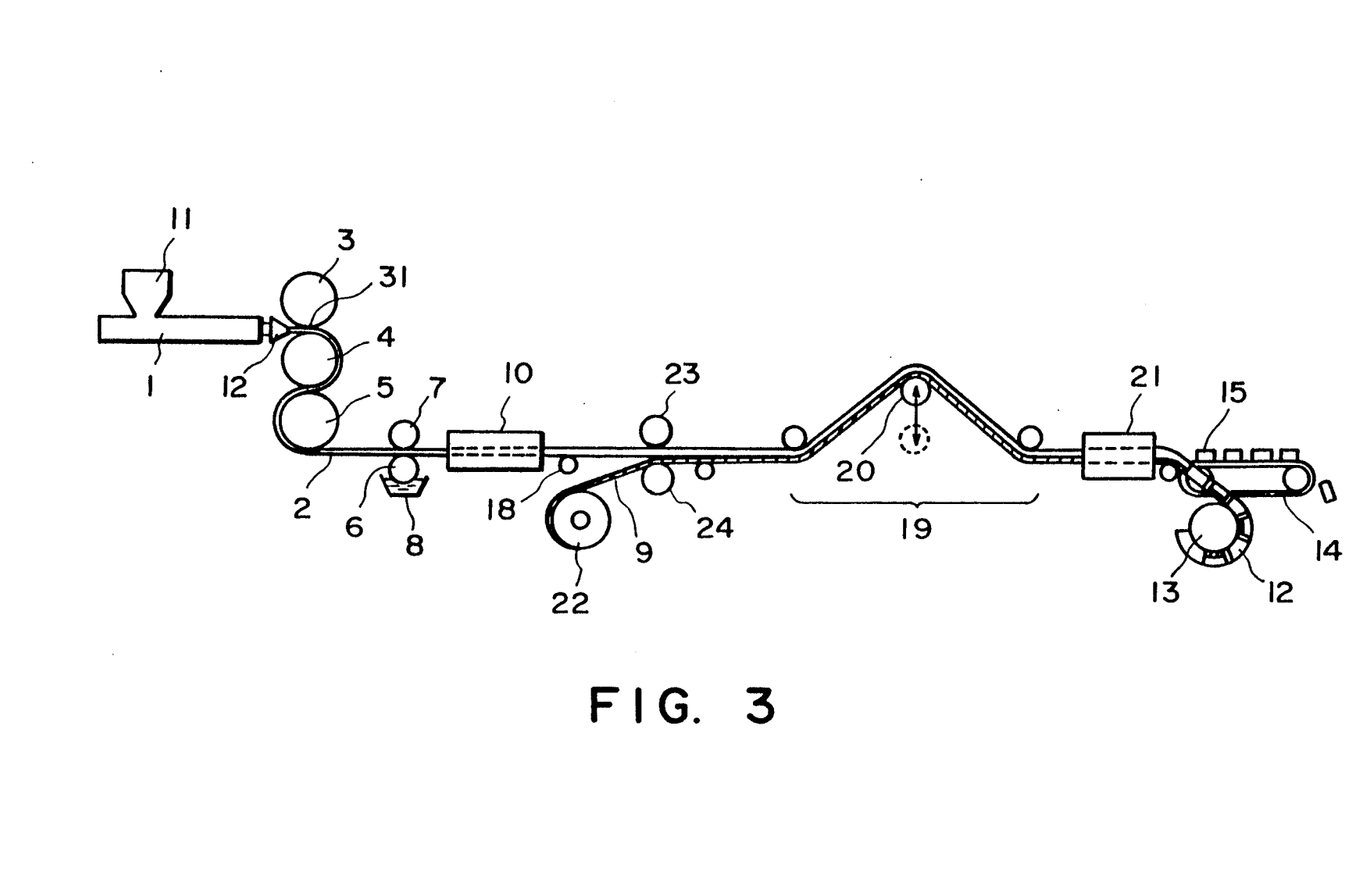
FIGS. 3 and 4 are schematic sectional views each showing another embodiment of the present invention which is capable of continuously conducting a step of forming a protective member and a cutting step.

FIG. 3 shows another embodiment of the present invention. Referring to FIG. 3, resin pellets (not shown) are melted in an extruder 1, and is extruded therefrom through a T-die 12 to be shaped into a sheet form 2, a pre-format is then formed on the sheet 2 by using roller stamper 4 and mirror surface rollers 3 and 5, and thereafter a recording layer is formed on the sheet 2 in the same manner as described with reference to FIG. 1, whereby an optical recording medium in a sheet form is produced. In FIG. 3, after the recording layer is formed, the optical recording medium in the sheet form is passed through a tunnel drying stove 10 thereby to remove a solvent therefrom, and thereafter, a protective member 9 is disposed thereon.

In order to dispose or form the protective member 9, there may be used: (1) a method wherein a protective substrate or film is directly laminated or bonded onto the recording layer; (2) a method wherein a protective film is directly formed on the recording layer; (3) a method wherein a protective member is laminated to the recording layer surface so as to provide a layer of air therebetween; etc.

In the embodiment as shown in FIG. 3, the protective sheet 9 is fed from a roll-type feeder 22, and is bonded to the optical recording medium in the sheet form by means of pressing rollers 23 and 24. Such a method is applicable to the above-mentioned method (1) (i.e., direct laminating) or the method (3) wherein the protective member is laminated on the recording layer by the medium of an air layer.

Figure 6:
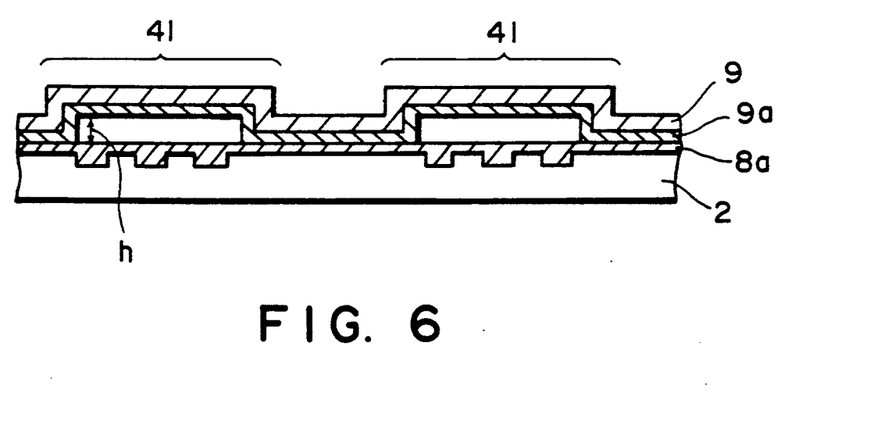
FIG. 6 is a schematic sectional view showing an optical recording medium obtained in Example 6 appearing hereinafter.

In the above-mentioned method (3), it is preferred to impart an unevenness shape to the protective member 9 in advance as shown in FIG. 6 so that it provides a contact portion contacting the optical recording medium in the sheet form, in a region outside the recording region thereof (i.e., a portion of the optical recording medium wherein a pre-format is provided), and a predetermined layer of air is retained on the recording region of the optical recording medium under the protective member. The protective member used for such a purpose may for example be one such that a member having a protective sheet surface, which has separately been provided with unevenness by vacuum forming, is wound in a hoop form. Alternatively, a protective member not provided with unevenness may be used and an adhesive containing beads may be supplied to a portion of the optical recording medium in the sheet form outside the recording region, and a protective sheet in a flat plate form may be laminated thereon so as to provide an optical recording medium in a sheet form having a layer of air on the recording region.

On the other hand, in order to laminate the protective member on the optical recording medium, there may be used a method wherein the protective member is bonded to the optical recording medium by using an adhesive or an adhesive tape, or a method wherein the protective member is directly welded to the substrate by means of an ultrasonic welder or a hot press.

Referring to FIG. 3, the optical recording medium in the sheet form provided with the protective member 9 is separated into individual optical recording media 15 by means of a cutting machine 21. The thus separated optical recording media 15 are then conveyed by a conveyer belt 14, and the residual material 12 obtained after the optical recording media 15 are cut is wound about a drum 13. The above-mentioned cutting of the sheet may be conducted by punching using a die and an oil hydraulic press; or by cutting using a laser beam.

In the present invention, a continuous resin sheet may be processed as such, and the resin sheet may be conveyed as such until it is subjected to the above-mentioned cutting step. As a result, the resin sheet may be conveyed by using relatively simple rollers.

In the present invention, there may be disposed, as desired, a mechanism for automatic locating or positioning to be used in the step of laminating the protective member on the resin sheet or the step of punching the optical recording medium. More specifically, when a protective member preliminarily provided with a prescribed unevenness is used in order to provide a layer of air, the protective member is bonded to the optical recording medium outside the recording region thereof. Accordingly, in such a case, it is preferred to detect a position in which a pre-format is formed, and to regulate the movement of the resin sheet in the direction parallel to or perpendicular to the movement so that the portion of the protective member provided with the unevenness is disposed corresponding to the predetermined portion of the optical recording medium.

In the case of an optical recording medium, the punching step particularly requires precision. Accordingly, in this step, it is preferred to provide a locating or positioning mechanism for positioning a punching means and the position of the optical recording medium sheet to be punched. For example, it is preferred to detect an inner or outer track on the substrate by detecting the reflection light based on a laser spot, or to detect a positional signal by reading a groove or another marker provided on the substrate by means of CCD (charge coupled device), so that a punching press is moved corresponding to the resultant positional information.

In the present invention, it is preferred to convey the sheet after the formation of the recording layer, while slackening the sheet to some extent, in order to attain suitable flexibility in the above-mentioned positioning operation.

The embodiment as shown in FIG. 3, wherein the coating liquid is applied onto the lower side of the sheet, is advantageous since dust is easily prevented from attaching to the resultant coating surface. In such an embodiment, it is preferred to use a roller 20 capable of contacting the sheet on the end or side portions thereof so that it does not substantially contact the coating surface to be used as the recording surface.

In the process shown in FIG. 3, the cutting of the optical recording medium as the final step can be conducted in a sufficiently short period of time. However, even when the above-mentioned marker for cutting is used, it is preferred to stop the resin sheet at the time of the cutting so that the cutting precision may be further enhanced.

On the other hand, at the time of melt-extrusion of the resin sheet, formation of the unevenness pre-format, and formation of the recording layer, it is preferred to form or convey the resin sheet at a constant speed in order to prevent the occurrence of a defect such as thickness irregularity and distortion or strain in the resin sheet, transfer failure of the unevenness pre-format, and irregularity in coating for the recording layer.

Accordingly, in the present invention, it is preferred to provide a mechanism for slackening the resin sheet before the device for conducting the cutting step in order to successively conduct the above-mentioned steps wherein the resin sheet is conveyed as a continuous sheet, and the cutting step wherein the resin sheet is stopped.

In FIG. 3, a slackening mechanism 19 changes the position of the roller 20 up and down with respect to the resin sheet by using a spring (not shown) so as to connect the cutting step wherein the resin sheet is intermittently conveyed, and the steps of from the extrusion of the resin to the lamination of the protective member 9 wherein the resin sheet is continuously conveyed. As a result, these two different types of steps may be conducted successively.

In addition to the steps as shown in FIG. 1, there may be provided between suitable steps, as desired, a step of discharging the resin sheet 2 or removing dust therefrom so that dust is prevented from attaching to the resin sheet having the unevenness pre-format due to the electrification thereof. Further, it is preferred to cover an appropriate portion, e.g., a portion extending from the melt-extrusion unit for the resin sheet to the unit for disposing the protective member 9, with a clean tunnel, in view of the protection from dust attachment.

In practical use, it is possible to insert or add an optional step between the above-mentioned steps or to add an optional step to these steps. Specific examples of such a step may include a step of labeling, a step of printing a lot number, or a step of encasing, etc. Further, a feedback control system based on various inspection steps or results of inspection may be provided as desired. Specific examples to be provided between or after respective steps may include optical inspections such as measurement of birefringence, transmittance or reflectivity of the medium or coating film, inspection of a defect including scratch and dust invasion, measurement for determining the quality of sheet thickness or grooves formed, and evaluation of disk or card performance.

In order to obtain the roller stamper 4 having an evenness pre-format pattern to be used in the process for producing an optical recording medium according to the present invention, a conventional nickel stamper which has been used for producing an optical recording medium is bonded to a roller which has been subjected to mirror grinding; or an unevenness pre-format pattern is formed on a roller substrate directly, or by the medium of a pattern-forming layer, by using a photolithographic technique.

The pre-format pattern to be formed on the pre-format roller 4 may for example be one corresponding to a pre-format such as tracking groove for an optical disk or card. Specific examples of such a pattern may include: tracking grooves in a spiral or concentric circle, or parallel form for an optical disk or optical card which may preferably have a width of about 0.5–2 microns, a pitch of about 1.0 to 5 microns and a depth of about 200 Å to 5000 Å; tracking grooves in a spiral, concentric circle, or parallel form for an optical disk or optical card which may preferably have a width of about 2–5 microns, a pitch of about 8 to 15 microns and a depth cf about 200 to 5000 Å.

As described hereinabove, according to the present invention, there is provided a process for producing an optical recording medium wherein the steps from the formation of a resin sheet to the formation of an unevenness pre-format, further to the formation of a recording layer may be conducted continuously and successively by using a simple apparatus. Accordingly, the present invention provides a process for producing an optical recording medium which is excellent in productivity and is low in cost. Since the process according to the present invention does not include a wet process for forming an unevenness pre-format pattern, a developer liquid to be used in the wet process does not affect the recording layer. Further, the present invention may provide an excellent optical recording medium including a substrate wherein the error rate is low and optical anisotropy such as birefringence is little.

In addition, according to the present invention, it is not necessary to provide a step of removing birefringence in the resin sheet or of smoothing the surface thereof between the step of forming the pre-format on the resin sheet and the coating step for forming the recording layer. As a result, the process according to the present invention may successively produce optical recording media having high precision.

Hereinbelow, the present invention is described in more detail with reference to Examples.

EXAMPLE 1

An optical recording medium was prepared by using an apparatus as shown in FIG. 1.

More specifically, resin pellets as the material for a substrate used herein were those of polycarbonate (number-average molecular weight=35,000, trade name: Panlite L-1250, mfd. by Teijin Kasei K.K.). These resin pellets were melted and extruded from a T-die 12 heated up to 295° C., to form a 200 mm-wide resin sheet 2. The resultant resin sheet 2 was passed between a roller stamper 4 and a mirror surface roller 3 and between the stamper roller 4 and a mirror surface roller 5 as shown in FIG. 1. The roller stamper 4 and mirror surface rollers 3 and 5 comprised a roller of carbon steel and a 100 micron-thick Cr plating disposed on the surface thereof, and had a diameter of 300 mm and a length of 400 mm. The clearance between the roller stamper 4 and the mirror surface roller 5 was 1.20 mm, and the rollers 4 and 3 were rotated so that their rotational speeds ($w_4$ and $w_3$) became equal to each other. The rollers 4 and 5 were rotated so that the rotational speed ($w_4$) of the roller 4 and the rotational speed ($w_5$) of the roller 5 provided a ratio ($w_4/w_5$) of 1.004.

Figure 5:
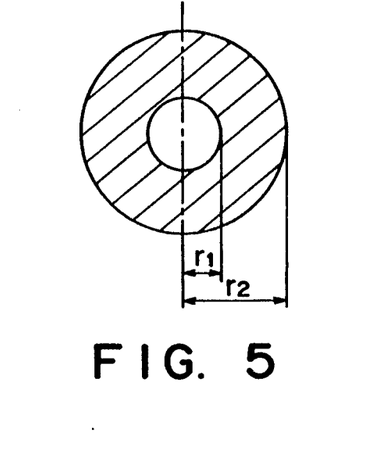
FIG. 5 is a schematic plan view for illustrating an embodiment of the region wherein a pre-format is formed.

The roller stamper 4 used herein comprised the above-mentioned 300 mm-diameter roller and a stamper in a flat-plate form bonded thereto by an adhesive. The stamper comprised Ni and had a predetermined pre-format pattern for transferring a spiral tracking groove (pitch=1.6 micron, width=1.0 micron, depth=1000 Å) to a doughnut-like region surrounded by two circles respectively having a radii of $r_2=64$ mm and $r_1=29$ mm, as shown in FIG. 5.

In this instance, the distance from the T-die 12 to the nip point 31 between the roller stamper 4 and the mirror surface roller 3 was 7.5 cm and the resin sheet 2 was conveyed at a speed of 2 m/min.

In the above-mentioned manner, there was prepared a resin sheet 2 onto which the pre-format and mirror surface had been transferred. With respect to the thus prepared resin sheet, the transfer precision for the pre-format, birefringence and surface precision or flatness were measured. The results are shown in Table 1 appearing hereinafter.

Then, a coating liquid of 3 wt. % solution for a recording layer obtained by dissolving a polymethine-type (trade name: IR-820, mfd. by Nihon Kayaku K.K.) in diacetone alcohol was applied onto the entire surface of the resin sheet 2 on which the pre-format had been formed, by means of a gravure coater so as to provide a recording layer thickness after drying of 1000 Å. At the time of the coating for the recording layer, the resin sheet showed a surface temperature of 40° C.

After the above-mentioned coating film was dried, the resultant optical recording medium in the sheet form was cut into a doughnut-like disk form having an inside diameter of 15 mm and an outside diameter of 130 mm, thereby to obtain an optical disk. The above procedure was conducted for 1 hour under the above-mentioned conditions to obtain 1200 optical disks. With respect to the thus obtained optical disks, irregularity in reflectivity of the recording layer was measured The results are shown in Table 1 appearing hereinafter.

EXAMPLES 2–5

Optical disks were prepared in the same manner as in Example 1 except that the following conditions were respectively used.

|  | EX. 2 | EX. 3 | EX. 4 | EX. 5 |
|---|---|---|---|---|
| Temp. of T-die (°C.) | 330 | 300 | 300 | 310 |
| Distance between T-die and nip point (cm) | 7.5 | 8 | 20 | 10 |
| $w_4/w_5$ | 1.004 | 1.001 | 1.002 | 1.004 |
| Sheet conveyance speed (m/min) | 0.3 | 4 | 10 | 2 |
| Surface temp. of resin at the time of coating (°C.) | 30 | 40 | 40 | 30 |

With respect to the thus prepared optical disks, the transfer precision for the pre-format, birefringence and flatness were measured. The results are shown in the following Table 1.

TABLE 1

|  | Transfer precision | Bi-refringence | Flatness | Irregularity in reflectivity |
|---|---|---|---|---|
| EX. 1 | A | A | A | A |
| EX. 2 | A | B | B | B |
| EX. 3 | A | A | A | A |
| EX. 4 | B | B | B | B |
| EX. 5 | A | A | A | A |

In the above Table 1, the symbols have the following meanings:

Transfer precision
A: 90% or more
B: 80% or more
C: 70% or more
D: 60% or more
Birefringence
A: 15 mm or less
B: 15–20 nm
C: 20–30 nm
D: 30–50 nm
Flatness
A: 1 mm or less
B: 1–3 mm
C: 3–5 mm
D: 5–10 mm
Irregularity in reflectivity (A)

-continued

A: 10% or less
B: 20% or less
C: 30% or less
D: 40% or less

The above-mentioned respective items were evaluated in the following manner.

Transfer Precision

The depths of the pre-format were measured by observing random 10 sections of the resin sheet on which the pre-format had been transferred, with a scanning electron microscope, and an average of the thus measured depths was obtained. Then, the proportion of the above-mentioned average to the height of the corresponding pre-format pattern of the stamper was calculated, and evaluated according to the above-mentioned standard.

Birefringence

Birefringence was measured by means of a polarimeter (SP-224, mfd. by Shinko Seiki K.K.) corresponding to a single path by using a laser light having a wavelength of 830 nm and a spot diameter of 1 mm.

Flatness (or Waviness)

The resin sheet obtained without applying a coating liquid was punched into a prescribed size corresponding to an optical disk or card. The thus obtained product was placed on a flat surface of a surface plate and the resultant maximum height difference was measured by means of an optical microscope.

Irregularity in Reflectivity

The reflectivity of an optical recording medium obtained by forming a recording layer and cutting the resultant product was measured by means of a spectrophotometer (mfd. by Ohtsuka Denshi) by use of a light having a wavelength of 830 nm and a spot diameter of 1 mm, whereby the maximum value (Rmax) and minimum value (Rmin) in the reflectivity were determined. Then, the above-mentioned value (A) was calculated according to the following formula:

$A = [(Rmax - Rmin)/Rmax] \times 100$

EXAMPLE 6

Referring to FIG. 6, a pre-format was formed on a resin sheet 2 and a coating liquid for recording layer 8a was applied thereonto in the same manner as in Example 1. Thereafter, the recording layer was dried by dry air heated up to 30° C., whereby an optical recording medium in a sheet form was provided. The dry air used herein was passed through an air filter of 0.2 micron and was supplied to the inside of a tunnel having a length of 3 m at a flow rate of about 1 m/min to 5 m/min so that it flowed in a direction reverse to the moving direction of the resin sheet and it provided a laminar flow in the tunnel.

Separately, projections 41 having a height (h) of 0.4 mm and a diameter of 130 mm were formed in a 0.2 mm-thick polycarbonate resin sheet 9 by vacuum forming as shown in FIG. 6. The resultant polycarbonate resin sheet as a protective member 9 was laminated on the above-mentioned optical recording medium in the sheet form as shown in FIG. 6 while positioning these members so that the polycarbonate resin sheet 9 contacted the optical recording medium outside the recording portion thereof. Then, the protective member was bonded to the optical recording medium outside the recording region by using an ethylene-vinylacetate-type adhesive 9a which had been applied onto the surface of the protective member 9.

Then, the optical recording medium was positioned by reading the guide groove for tracking by use of a laser, and was punched by means a die of a press at a punching speed of 12 pieces/min. In this instance, the respective steps were conducted by continuously conveying the resin sheet 2 at a speed of 2 m/min till the protective member-laminating step, but the cutting was intermittently conducted.

It was possible to conduct the cutting for a sufficiently short period of time. However, since the sheet was not continuously conveyed in the cutting step, a mechanism for slackening the resin sheet 2 was provided between the unit for disposing the protective member 9 and the unit for cutting.

EXAMPLE 7

An optical card was prepared by using an apparatus as shown in FIG. 4.

More specifically, referring to FIG. 4, resin pellets as the material for a substrate used herein were those of polycarbonate (number-average molecular weight = 35,000, trade name: Panlite L-1250, mfd. by Teijin Kasei K.K.). These resin pellets were melted and extruded from a T-die 12 heated up to 310° C., to form a 200 mm-wide resin sheet 2. The resultant resin sheet 2 was passed between a roller stamper 4 and a mirror surface roller 3 and between the stamper roller 4 and a mirror surface roller 5 as shown in FIG. 4. The roller stamper 4 and mirror surface rollers 3 and 5 had a diameter of 300 mm and a length of 400 mm. The rollers 4 and 3 were rotated so that their rotational speeds ($w_4$ and $w_3$) became equal to each other (i.e., $w_4/w_3 = 1$). The rollers 4 and 5 were rotated so that the rotational speed ($w_4$) of the roller 4 and the rotational speed ($w_5$) of the roller 5 provided a ratio ($w_4/w_5$) of 1.002.

The roller stamper 4 used herein comprised the above-mentioned roller and a 0.1 mm-thick Ni stamper in a flat-plate form bonded thereto by an adhesive. The stamper had a predetermined pre-format pattern for transferring a spiral tracking grooves (pitch = 12 microns, width = 3 microns, depth = 2700 Å) to a rectangular region having a length of 300 mm and a width of 200 mm wherein the tracking grooves were formed in parallel with the longitudinal direction thereof. In this instance, the distance from the T-die 12 to the nip point 31 between the roller stamper 4 and the mirror surface roller 3 was 8 cm and the resin sheet 2 was conveyed at a speed of 4 m/min.

In the above-mentioned manner, there was prepared a resin sheet 2 onto which the pre-format and mirror surface had been transferred. With respect to the thus prepared resin sheet, the transfer precision for the pre-format, birefringence and surface precision were measured. The results are shown in Table 2 appearing hereinafter.

Then, a coating liquid of 3 wt. % solution for a recording layer obtained by dissolving a polymethine dye (trade name: IR-820, mfd. by Nihon Kayaku K.K.) in diacetone alcohol was applied onto the entire surface of the resin sheet on which the pre-format had been formed, by means of a gravure coater so as to provide a recording layer thickness after drying of 1000 Å. At the time of the coating for the recording layer, the resin sheet showed a surface temperature of 35° C.

After the above-mentioned coating film was dried, a 0.3 mm-thick polycarbonate resin sheet 9 as a protective member provided with a hot-melt type adhesive and wound in a roll form 22 was laminated on the recording layer and pressed under heating by means of pressing rollers 23 and 24 heated up to 110° C. thereby to bond the protective member 9 to the optical recording medium Then the resultant optical recording medium in the sheet form was cut into a rectangular form having a length of 85 mm and a width of 54 mm by using a punching means 21, thereby to obtain an optical card. With respect to the thus obtained optical card, irregularity in reflectivity of the recording layer was measured. The results are shown the following Table 2.

TABLE 2

| | Transfer precision | Bi-refringence | Flatness | Irregularity in reflectivity |
|---|---|---|---|---|
| EX. 6 | A | A | A | A |

REFERENCE EXAMPLES 1-7

Optical disks were prepared in the same manner as in Example 1 except that the following conditions were respectively used.

| Reference Example | Temperature of T-die (°C.) | Distance between T-die and nip point (cm) | $w_4/w_5$ | Sheet conveyance speed (m/min) | Surface temperature of resin (°C.) |
|---|---|---|---|---|---|
| 1 | 255 | 8 | 1.004 | 3 | 30 |
| 2 | 310 | 25 | 1.002 | 2 | 25 |
| 3 | 310 | 15 | 1.005 | 3 | 30 |
| 4 | 310 | 15 | 1.0 | 1 | 25 |
| 5 | 300 | 20 | 1.001 | 2 | 30 |
| 6 | 320 | 10 | 1.001 | 0.2 | 25 |
| 7 | 310 | 10 | 1.002 | 2 | 65 |

With respect to the thus prepared optical disks, the transfer precision for the pre-format, birefringence and flatness were measured. The results are shown in the following Table 3.

TABLE 3

| Ref. Ex. | Transfer precision | Bi-refringence | Flatness | Irregularity in reflectivity |
|---|---|---|---|---|
| 1 | C | D | B | C |
| 2 | D | D | D | D |
| 3 | B | D | D | D |
| 4 | B | D | B | C |
| 5 | C | C | C | C |
| 6 | B | C | C | C |
| 7 | A | A | A | D* |

*Cracks occurred.

What is claimed is:

1. A process for producing an optical recording medium, comprising the steps of:
   melt-extruding a resin to form a softened extruded resin sheet;
   before the softened extruded resin sheet hardens, passing said resin sheet under pressure between a first roller having a predetermined unevenness pattern and a second roller disposed adjacent to a first side thereof and, while the resin sheet remains in contact with said first roller, passing said resin sheet under pressure between said first roller and a third roller disposed adjacent to a second side of said first roller, thereby to transfer the unevenness pattern of said first roller to a surface of the resin sheet; and
   forming a recording layer comprising an organic coloring matter on the surface of the resin sheet which is provided with the unevenness pattern,
   wherein the first roller rotates at a peripheral speed of $W_4$ and the third roller rotates at a peripheral speed of $W_5$, thereby providing a ratio $W_4/W_5$ which satisfies a relationship $1.0 < W_4/W_5 \leq 1.004$.

2. A process according to claim 1, wherein the resin is melt-extruded through a die.

3. A process according to claim 1, wherein the recording layer is formed on the resin sheet by coating when the surface temperature of the resin sheet is 50° C. or lower.

4. A process according to claim 3, wherein the recording layer is formed on the resin sheet by coating when the surface temperature of the resin sheet is 40° C. or lower.

5. A process according to claim 1, wherein after the recording layer is formed on the resin sheet, a protective member is laminated on the recording layer and the resultant resin sheet comprising the recording layer and the protective member is cut into a plurality of recording media while the resin sheet is moved.

6. A process according to claim 5, wherein the resin sheet is extruded, the unevenness pattern is transferred to the resin sheet, the recording layer is formed on the resin sheet, and the protective member is laminated on the recording layer while the resin sheet is continuously moved; and the resultant resin sheet is cut into plural recording media while the resin sheet is intermittently moved.

7. A process according to claim 2, wherein the die is heated up to a temperature which is higher than the glass transition temperature, of the resin by 110° C. to 200° C.

8. A process according to claim 7, wherein the die is heated up to a temperature which is higher than the glass transition temperature of the resin by 130° C. to 190° C.

9. A process according to claim 1, wherein the resin sheet has a thickness of 0.2-2.0 mm after the unevenness pattern is transferred thereto.

10. A process according to claim 1, wherein said ratio of the peripheral speed of the first roller ($w_4$) and that of the third roller ($w_5$) satisfies a relationship of $1.001 \leq w_4/w_5 \leq 1.003$.

11. A process according to claim 10, wherein said ratio of the peripheral speed of the first roller ($w_4$) and that of the third roller ($w_5$) satisfies a relationship of $1.001 \leq w_4/w_5 \leq 1.0025$.

12. A process according to claim 1, wherein the resin sheet is moved at a speed of 0.3 m/min to 10 m/min.

13. A process according to claim 12, wherein the resin sheet is moved at a speed of 0.5 m/min to 4 m/min.

14. A process according to claim 13, wherein the resin sheet is moved at a speed of 1 m/min to 3 m/min.

15. A process according to claim 1, wherein the distance from the die to a nip point between the first and second rollers is 20 cm or shorter.

16. A process according to claim 15, wherein the distance from the die to the nip point between the first and second rollers is 15 cm or shorter.

17. A process according to claim 16, wherein the distance from the die to the nip point between the first and second rollers is 10 cm or shorter.

18. A process for producing a substrate sheet for an optical recording medium, comprising the steps of:

melt-extruding a resin to form a softened extruded resin sheet; and before the softened extruded resin sheet hardens, passing said resin sheet under pressure between a first roller having a predetermined unevenness pattern and a second roller disposed adjacent to a first side thereof and, while the resin sheet remains in contact with said first roller, passing said resin sheet under pressure between said first roller and a third roller disposed adjacent to a second side of said first roller, thereby to transfer the unevenness pattern of said first roller to a surface of the resin sheet;

wherein the first roller rotates at a peripheral speed of $W_4$ and the third roller rotates at a peripheral speed of $W_5$, thereby providing a ratio $W_4/W_5$ which satisfies a relationship $1.0 < W_4/W_5 \leq 1.004$.

* * * * *

UNITED STATES PATENT AND TRADEMARK OFFICE
CERTIFICATE OF CORRECTION

PATENT NO. : 5,137,661

DATED : August 11, 1992

INVENTOR(S) : Kanome et al.

It is certified that error appears in the above-identified patent and that said Letters Patent is hereby corrected as shown below:

On title page, item

[63] Related U.S. Application Data:

"Feb. 2, 1991," should read --Feb. 21, 1991,--.

COLUMN 1:

Line 36, "thereon" should read --thereon.--.

COLUMN 10:

Line 66, "cf" should read --of--.

COLUMN 12:

Line 20, "measured" should read --measured.--.

COLUMN 14:

Line 48, "grooves" should read --groove--.

COLUMN 15:

Line 12, "dium" should read --dium.--.

UNITED STATES PATENT AND TRADEMARK OFFICE
CERTIFICATE OF CORRECTION

PATENT NO. : 5,137,661

DATED : August 11, 1992

INVENTOR(S) : Kanome et al.

It is certified that error appears in the above-identified patent and that said Letters Patent is hereby corrected as shown below:

COLUMN 16:

Line 16, ", of" should read --of--.

COLUMN 17:

Line 5, "claim 1," should read --claim 2,--.

Signed and Sealed this

Fifth Day of October, 1993

Attest:

BRUCE LEHMAN

Attesting Officer     Commissioner of Patents and Trademarks